(12) United States Patent
Button

(10) Patent No.: US 11,206,762 B2
(45) Date of Patent: Dec. 28, 2021

(54) CROP ROW MOWER

(71) Applicants: David D. Button, Great Bend, KS (US); Barbara J. Button, Great Bend, KS (US)

(72) Inventor: David D. Button, Great Bend, KS (US)

( * ) Notice: Subject to any disclaimer, the term of this patent is extended or adjusted under 35 U.S.C. 154(b) by 234 days.

(21) Appl. No.: 16/523,080

(22) Filed: Jul. 26, 2019

(65) Prior Publication Data
US 2019/0343042 A1 Nov. 14, 2019

(51) Int. Cl.
*A01D 34/835* (2006.01)
*A01D 34/64* (2006.01)
*A01D 34/80* (2006.01)

(52) U.S. Cl.
CPC ........... *A01D 34/835* (2013.01); *A01D 34/64* (2013.01); *A01D 34/80* (2013.01)

(58) Field of Classification Search
CPC ...... A01D 34/835; A01D 34/64; A01D 34/80; A01D 75/30; A01D 34/664; A01D 34/68; A01D 34/84; A01B 39/08; A01B 39/18
USPC .......................................................... 56/11.9
See application file for complete search history.

(56) References Cited

U.S. PATENT DOCUMENTS

| | | | |
|---|---|---|---|
| 2,952,961 A | 9/1960 | Engler | |
| 2,986,864 A | 6/1961 | Young | |
| 3,115,738 A | 12/1963 | Engler | |
| 3,129,773 A * | 4/1964 | Freeman | A01B 21/06 172/522 |
| 3,264,807 A | 8/1966 | Wallace | |
| 3,400,521 A | 9/1968 | Caldwell | |
| 3,550,360 A | 12/1970 | Ver Der Lely | |
| 3,650,096 A | 3/1972 | Caldwell | |
| 4,562,780 A * | 1/1986 | Leiblich | A01C 5/064 111/164 |
| 4,601,162 A | 7/1986 | Wessel | |
| 4,660,653 A * | 4/1987 | Mayeda | A01B 39/14 172/169 |
| 4,858,417 A | 8/1989 | Priefert et al. | |
| 5,133,174 A | 7/1992 | Parsons, Jr. | |
| 5,404,695 A | 4/1995 | Gemelli | |
| 5,435,118 A | 7/1995 | Cobile | |
| RE37,267 E | 7/2001 | Mosby | |
| 6,279,666 B1 * | 8/2001 | Nikkel | A01C 7/006 172/574 |
| 6,336,311 B1 | 1/2002 | Bednar | |

(Continued)

FOREIGN PATENT DOCUMENTS

EP 1190616 3/2002
JP H0698614 9/1992

*Primary Examiner* — Alicia Torres
*Assistant Examiner* — Matthew Ian Neal
(74) *Attorney, Agent, or Firm* — Kenneth H. Jack; Davis & Jack, LLC

(57) ABSTRACT

A crop row mower incorporating an "L" member having a column and having a foot, the column having upper and lower ends, and the foot having a distal end; a wheel connected operatively at the distal end of the foot; a first rotary blade mounted at the lower end of the column; a hydraulic motor mounted at the upper end of the column; a first drive shaft extending along the column, the first drive shaft operatively interconnecting the hydraulic motor, and the first rotary blade; and a mounting bracket fixedly attached to the column's upper end, wherein the mounting bracket is adapted for pushing or pulling the "L" member in a proximal direction.

8 Claims, 4 Drawing Sheets

(56) References Cited

U.S. PATENT DOCUMENTS

| | | | |
|---|---|---|---|
| 6,336,312 B1 | 1/2002 | Bednar et al. | |
| 6,381,934 B2 | 5/2002 | Heard | |
| 8,109,069 B2 | 2/2012 | Moe et al. | |
| 10,136,579 B2 | 11/2018 | Button | |
| 2014/0216830 A1 | 8/2014 | Henson | |
| 2017/0099769 A1* | 4/2017 | Badalini | A01B 39/08 |
| 2017/0181373 A1* | 6/2017 | Bassett | A01M 21/043 |
| 2018/0007834 A1* | 1/2018 | Martin | A01D 34/835 |
| 2018/0288939 A1* | 10/2018 | Bassett | A01D 34/835 |
| 2019/0082591 A1* | 3/2019 | Bassett | A01M 21/02 |

* cited by examiner

CROP ROW MOWER

FIELD OF THE INVENTION

This invention relates to agricultural mowing equipment. More particularly, this invention relates to such mowers which are specially adapted for mowing weeds growing between crop rows.

BACKGROUND OF THE INVENTION

The geometry of crop rows gives rise to difficulties and challenges in the configuration of mowing equipment for cutting of weeds growing between the crop rows. Spaces between crop rows are typically narrow and have a depth which varies in accordance with the growing height of adjacent crops. Mowing equipment which is capable of extending downwardly between multiple crop rows for mowing narrow swathes of weeds, and without damage to adjacent crops, is often mechanically complex and cumbersome, and often is manufactured only at great expense.

The instant inventive crop row mower effectively mows weeds between crop rows in an economical and mechanically simple and efficient fashion through the provision of a specialized "L" member structure which supports mowing accoutrements such as motors, drive shafts, and blades. Multiple renditions of such specialized "L" member are advantageously driveable or pullable along and between crop rows to effectively suppress weeds which compete with and reduce the yield of growing crops.

BRIEF SUMMARY OF THE INVENTION

A first structural component of the instant inventive crop row mower comprises an "L" member which has a column portion and has a foot portion. In a preferred embodiment, the column portion of the "L" member comprises a rigid and heavy duty steel "I" beam. The "L" member's foot component preferably comprises laterally paired steel plates which have proximal ends being bolted or welded to the laterally paired flanges of the "I" beam column. In the preferred embodiment, the foot component of the "L" member extends rearwardly or in a distal direction from the lower end of the column portion.

A wheel is preferably rotatably mounted at the distal end of the "L" member's foot, allowing the "L" member to be either rollably pushed or pulled by mechanized equipment along a crop row space. In the preferred embodiment, the rotatable attachment of the wheel includes an adjustable swivel arm assembly which allows the wheel to be selectively vertically positioned in relation to the distal end of the foot. Such wheel adjustability feature advantageously allows the height of the "L" member, along with its weed cutting blades, discussed below, to be operated at a selected weed cutting height.

A further structural component of the instant inventive crop row mower comprises at least a first, and preferably first and second, or left and right rotary blades. In the preferred embodiment, the blades are configured for orbiting horizontally in a counter-rotating fashion which draws inward flights of the blades alternatingly in the distal direction.

Motor means for rotatably driving the rotary blade components are preferably provided, such means being fixedly mounted at the upper end of the "L" member's column component. In a preferred embodiment, the motor means comprise a hydraulic motor. Suitably, the motor means may alternatively comprise an electric motor or a reciprocating piston internal combustion engine. Alternatively, the motor means may comprise an output end of a rotary power transmitting linkage.

Further structural components of the instant inventive crop mower comprise a first, and preferably a first and second or paired, drive shafts. Where paired drive shafts are provided, such shafts preferably parallel and extend along the column at its left and right sides. Each drive shaft preferably has a lower end attached in operative communication with one of the rotary blades, and rotary bearing mounts are provided for securely positioning the shafts at left and right sides of the column.

Where a single hydraulic motor is used to counter-rotate both blade axles, power transmission linkages are preferably mounted to the upper end of the column. Such linkages preferably include trains of beveled gears which translate a single source of rotary power provided by the hydraulic motor into rotation and counter-rotation of the drive shafts and their rotary blades.

A further structural component of the instant inventive row mower comprises a mounting bracket which is fixedly and rigidly attached to the column's upper end. In a preferred embodiment, the mounting bracket is adapted for attaching the crop row mower to a laterally extending boom arm which is driven in front of or pulled behind a self-propelled agricultural vehicle or tractor.

In operation of the instant inventive crop row mower, several renditions of the mower are preferably provided, each mower being fixedly attached to a self-propelled vehicle boom arm, as described above. The several renditions of the crop row mower are preferably spaced along the boom arm at intervals which coincide with the spacing of the crop rows to be mowed. Actuation of the motor means effectively rotates and counter-rotates each motor's rotary blades, allowing for progressive weed cutting while the row mowers are driven or pulled along the spaces between crop rows. During the mowers' weed cutting operation along and between the crop rows, the wheel components at the distal ends of the "L" members' feet effectively roll behind the weed cutting blades while consistently holding the blades at a pre-selected and appropriate elevation over the ground.

Accordingly, objects of the instant invention include the provision of a crop row mower which incorporates structures as described above, and which arranges those structures in manners described above, for the performance of useful functions, as described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
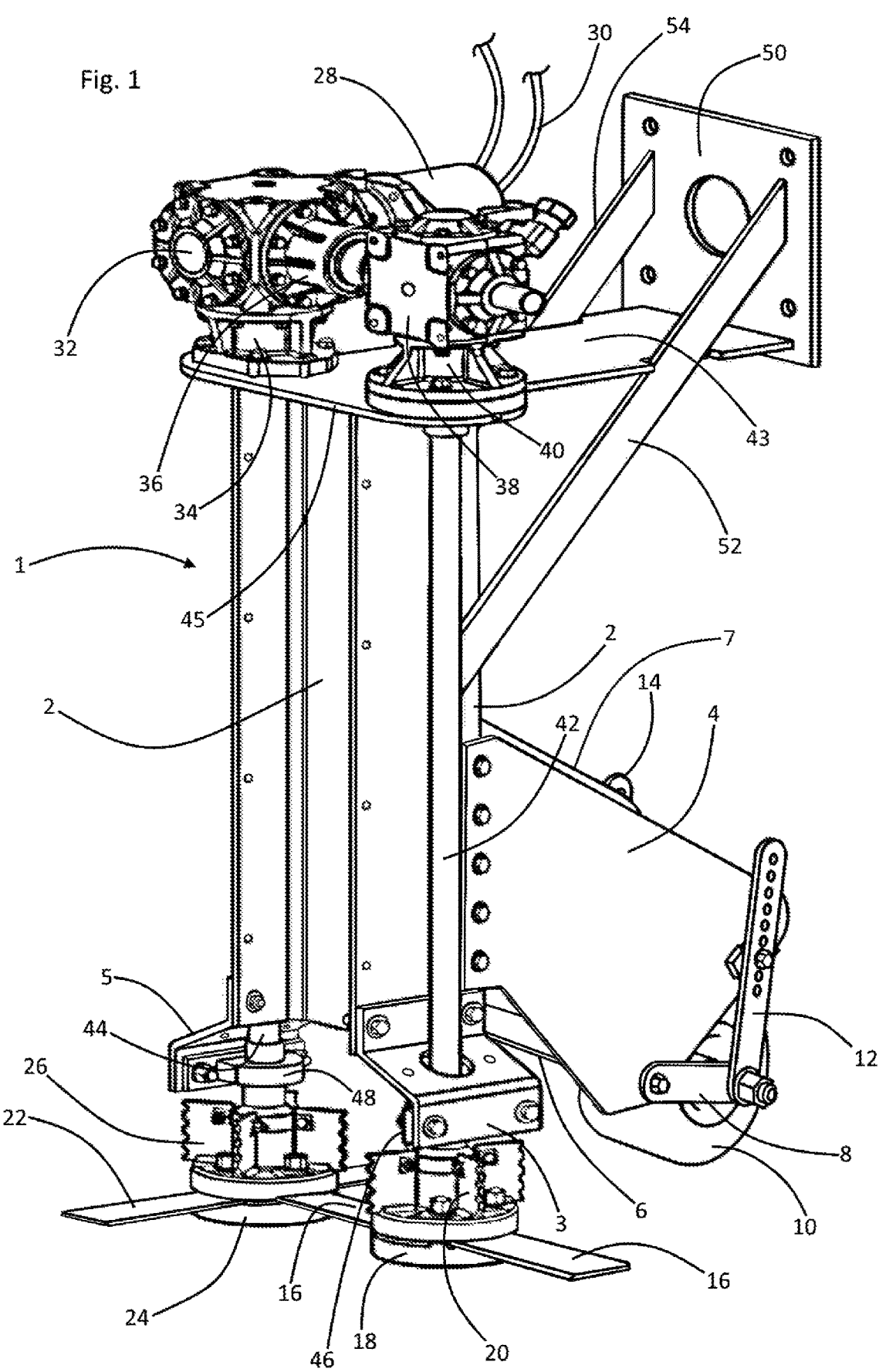
FIG. 1 is a perspective view of a preferred embodiment of the instant inventive crop row mower.

Referring now to the drawings and in particular to Drawing FIG. 1, a preferred embodiment of the instant inventive crop row mower is referred to generally by Reference Arrow 1. The crop row mower 1 preferably comprises an "L" member which, similarly with the structure of a common capital letter "L", has a column portion 2, and has a foot portion 4 and 7. The foot 4, 7 is fixedly attached to and extends rearwardly or distally from the column portion's lower end. In a preferred embodiment, the "L" member's foot 4, 7 comprises left and right steel plates whose proximal ends are fixedly welded or bolted (as depicted) to left and right flanges of the "I" beam configured column 2. A cross brace 6 spans between plates 4 and 7 in order to enhance the foot component's structural rigidity. Suitably, the "I" cross sectional shape of the column 2 may be produced via a double "C" channel beam weldment (not shown in views) having abutting webs.

A wheel 10 is preferably mounted by a rotary axle to the distal end of the foot 4, 7, such wheel 10 preferably being further attached by means of a pivot bracket 8 and adjustment bars 12, 14 combination. Vertical selecting of the points of attachment of the adjustment bars 12 and 14, to the foot plates 4 and 7 advantageously allows the vertical position of the wheel 10 relative to the column 2 to be adjusted, raising and lowering rotary cutting blades 16 and 22 with respect to the ground. Accordingly, selective changes of the points of the attachments of bars 12 and 14 upon plates 4 and 7 advantageously adjusts the blades' weed cutting height. In a suitable alternative embodiment of the instant invention, only a single rotary blade may be mounted and operated at the lower end of column 2.

Motor means are preferably mounted at the upper end of the column 2, such means preferably comprising a hydraulic motor 28 having hydraulic pressure supply and return lines 30. In a preferred embodiment, such lines 30 communicate with a hydraulic power system of an agricultural vehicle such as a tractor or self-propelled sprayer (not depicted within views). The hydraulic motor 28 is intended as being representative of other suitably provided alternative motor means such as electric motors and internal combustion engines. Where a remote source of rotary power is provided for turning the drive shafts and blades, the invention's motor means may suitably alternatively comprise a rotary power output end of a power transmission chain or linkage extending from such remote source. In order to facilitate secure positioning of the motor means at the upper end of the column 2, a mounting plate 45 is preferably rigidly attached at the upper end of the column 2.

A first drive shaft 42, and preferably first and second, or left and right drive shafts 42 and 44, are preferably provided. Each drive shaft 42 and 44 preferably parallels and extends along the column 2, such shafts being secured by rotary bearings 46 and 48. In order to respectively position shafts 42 and 44 leftwardly and rightwardly from the left and right sides of the column 2, the lower end of the column is preferably specially configured to include left and right flare plates 3 and 5 which are apertured for vertical receipts of shafts 42 and 44. Rotary power is translated from the hydraulic motor 28 to the upper ends of shafts 42 and 44 via rotary power transmissions 32 and 38 which include internal trains of 45° bevel gears. Transmission 32 has a rotary power input which directly communicates with the rotary power output of the hydraulic motor 28, and transmission 32 has a downward power output 34 and a leftward power output 36. Power transmission 38 correspondingly has a rotary power input which communicates with transmission 32's power output 36, and has a downward rotary power output 40. Upper ends of shafts 42 and 44 respectively communicate with the downward rotary power outputs 40 and 34. Accordingly, a single source of rotary power from the hydraulic motor 28 effectively rotates and counter-rotates shafts 42 and 44 via transmissions 32 and 38. In a suitable embodiment, the shaft and blade rotations are synchronized for avoidance of interference of blade 16 with blades 22. Alternatively, such blades may be slightly vertically displaced and/or laterally displaced for avoidance of interference. The blades 16 and 22 preferably counter-rotate so that the inward flights of their orbits travel distally or rearwardly, advantageously throwing cut weeds along the crop row rather than leftwardly and rightwardly against growing crops. Secondary weed cutting blades 20 and 26 are preferably respectively attached immediately above blade hubs 18 and 24, such blades 20 and 26 assisting in rearwardly conveying chopped weed chaff. Suitably, such secondary blades may be alternatively configured similarly with blades 16 and 22 with an angular upward extension, such blades further chopping and rearwardly conveying weed material.

A mounting bracket for driving or pulling the "L" member is preferably provided, such bracket preferably comprising a rearward or distal extension 43 of mounting plate 45. A boom arm attachment plate 50 is preferably welded to the extreme distal end of plate 43, and left and right triangulating arms 52 and 54 are preferably provided for purposes of rigidity and structural support of the mounting bracket.

In use of the instant inventive crop row mower, multiple renditions of the mower may be provided, each crop row mower being attached to a forward and laterally extending boom arm of a self-propelled agricultural vehicle such as a tractor or engine powered mobile sprayer. Attachments of the several crop row mowers along the boom arm preferably spaces them in accordance with the row spacing of the crop to be mowed. Thereafter, cutting height adjustment bars 12 and 14 are preferably raised and lowered downwardly from or upwardly toward the distal ends of the foot plates 4 and 7 so that rotary blades 16 and 22 cut weeds at a selected height above the ground. Following such assembly and set up, the agricultural vehicle may be driven over the crops with wheels preferably rolling along and between the crop rows without damaging the crops. During such vehicle driving motion, the crop row mowers are actuated for weed cutting while rolling along and between the crop rows.

Figure 2:
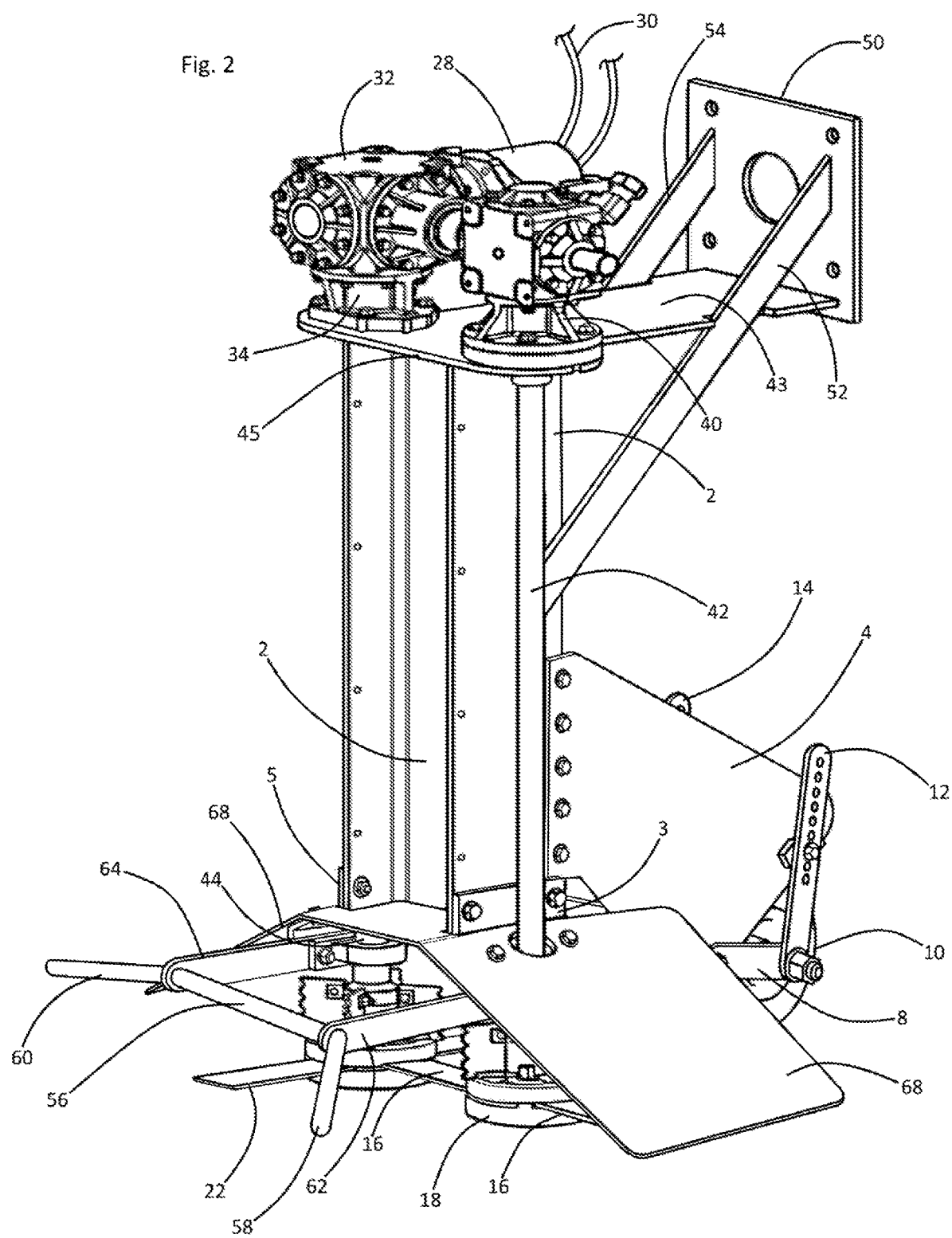
FIG. 2 redepicts the structure of FIG. 1, the view of FIG. 2 additionally showing an attached weed deflector bar and an attached blade shroud.

Referring simultaneously to FIGS. 1 and 2, a laterally extending weed deflector bar 56 is preferably provided, such bar being fixedly and rigidly mounted to the lower end of the column 2, suitably by means of forwardly or proximally cantilevering support arms 62 and 64. In the preferred embodiment, left and right extensions 58 and 60 of the deflector bar 56 angle forwardly for initially gathering weeds at a central cutting point for impingement against the counter-rotating blades 16 and 22.

Figure 3:
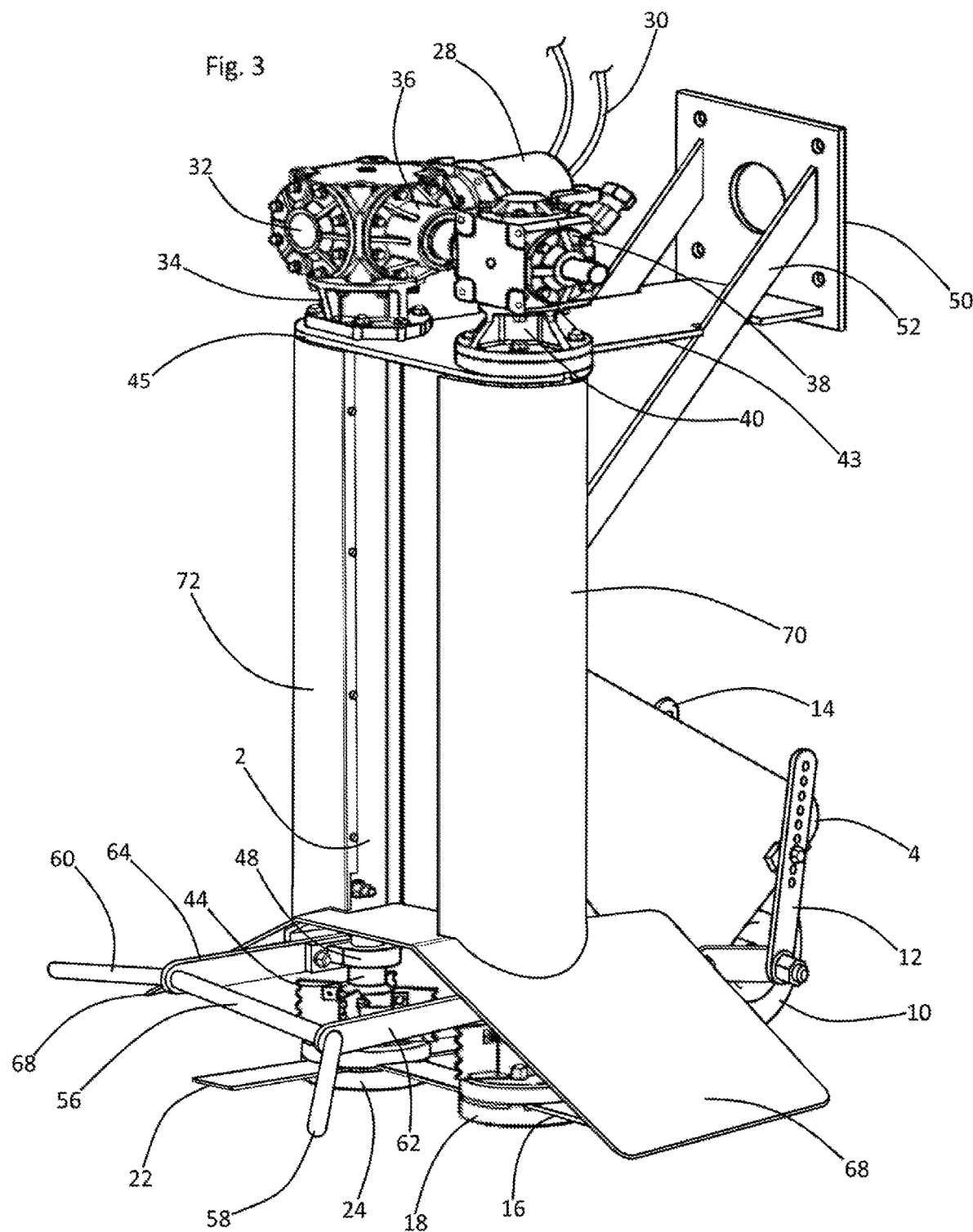
FIG. 3 redepicts the structures of FIGS. 1 and 2, the view of FIG. 3 further showing attached axle shrouds.

For purposes of safety, and for prevention of damage to growing crops resulting from rapidly thrown chopped weeds, a blade shroud 68 is preferably fixedly mounted to the lower end of the column 2. Referring further simultaneously to FIG. 3, left and right drive shaft shrouds 70 and 72 are preferably mounted to the column 2, such shrouds enhancing user safety and preventing weeds and plant materials from becoming wound about the shafts 42 and 44.

Figure 4:
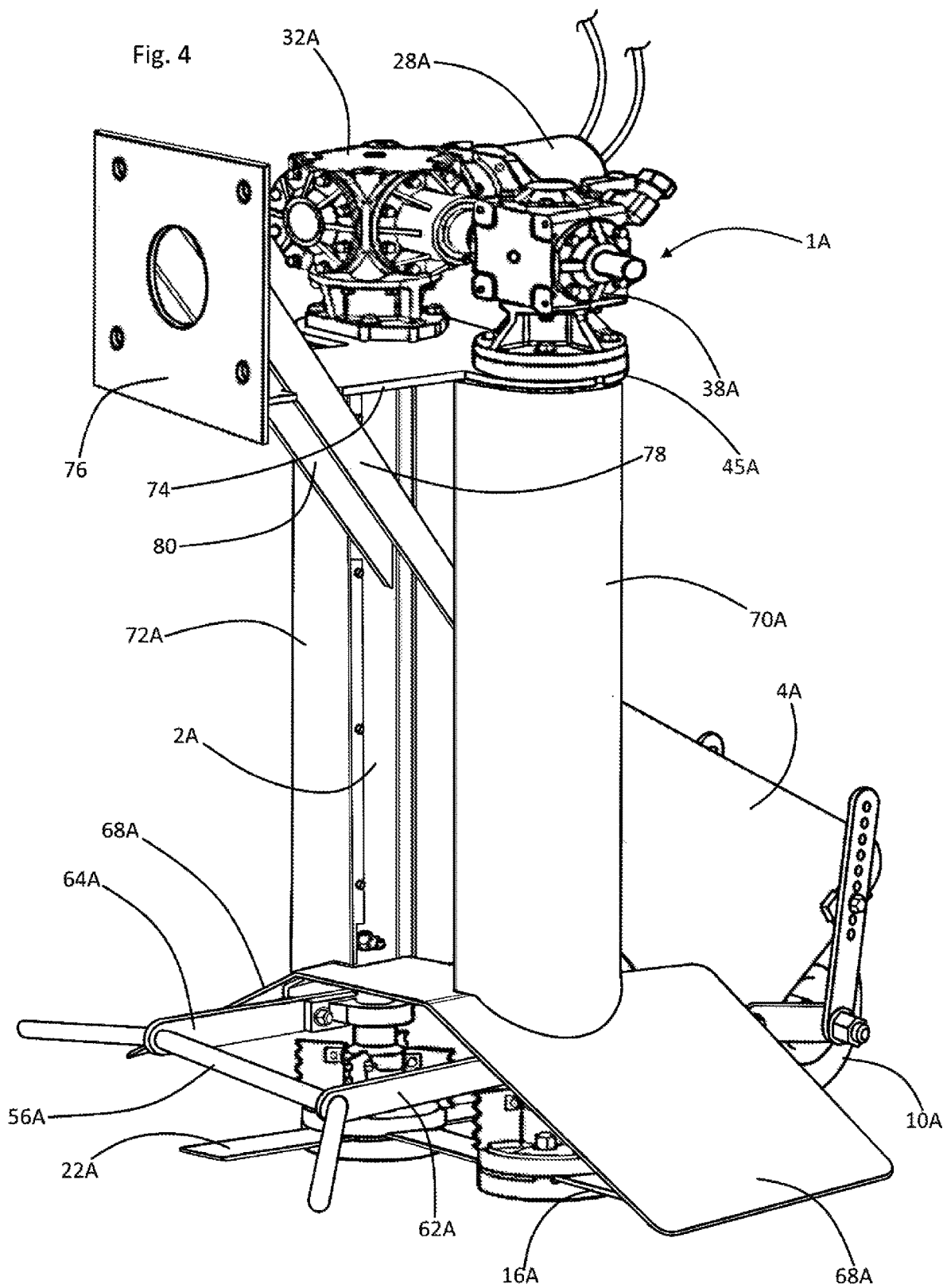
FIG. 4 presents and alternate configuration of the structure of FIG. 3, the view of FIG. 4 showing a proximally or forwardly extending mounting bracket.

Referring to FIG. 4, each structure identified by a reference numeral having the suffix "A" is configured substantially identically to similarly numbered structures appearing in FIGS. 1-3. In the FIG. 4 structural alternative, mounting plate 45A has a forward plate extension 74, as opposed to the rearward or distal plate extension 43 of FIGS. 1-3. In the FIG. 4 alternative, a forwardly extended boom arm mounting plate 76 and its associated triangulating and structurally stiffening arms 78 and 80 may be attached to an agricultural vehicle's rearwardly positioned boom arm. In the FIG. 4 embodiment, the mower 1A may be advantageously pulled at the rear of a vehicle from the front of the mower rather than pushed at the front of a vehicle from behind the mower.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A crop row mower comprising:
   (a) an "L" member having a column and having a foot, wherein the column comprises an "I" beam having a flange and having upper and lower ends, and wherein the foot has a distal end;
   (b) a wheel connected operatively at the distal end of the foot;
   (c) a first rotary blade mounted at the lower end of the "I" beam;
   (d) motor means mounted at the upper end of the "I" beam;
   (e) a first drive shaft extending along the "I" beam, the first drive shaft operatively interconnecting the motor means and the first rotary blade;
   (f) a mounting bracket fixedly attached to the column's upper end, the mounting bracket being adapted for pushing or pulling the "L" member in a proximal direction, and
   (g) a shroud fixedly attached to the "I" beam's flange, wherein the shroud overlies the first drive shaft.

2. The crop rower of claim 1 wherein the motor means comprise a hydraulic motor.

3. The crop rower of claim 2 further comprising a deflector bar fixedly attached to and cantilevering in the proximal direction from the column's lower end.

4. The crop rower of claim 3 wherein the operative connection of the wheel comprises a pivot bracket adapted for vertically repositioning the wheel.

5. The crop rower of claim 4 comprising a blade shroud fixedly attached to the column's lower end.

6. The crop rower of claim 5 wherein the fixed attachment of the drive shaft shroud to the "I" beam's flange comprises a plurality of fasteners.

7. The crop rower of claim 6 further comprising a second rotary blade mounted at the lower end of the "I" beam, a second drive shaft having a lower end connected operatively to the second rotary blade, and a rotary power transmission operatively interconnecting the hydraulic motor and an upper end of the second drive shaft.

8. The crop rower of claim 1 further comprising a secondary rotary blade mounted immediately above the first rotary blade.

* * * * *